United States Patent
Dubhashi et al.

(10) Patent No.: US 7,779,265 B2
(45) Date of Patent: Aug. 17, 2010

(54) ACCESS CONTROL LIST INHERITANCE THRU OBJECT(S)

(75) Inventors: Kendarnath A. Dubhashi, Redmond, WA (US); Balan Sethu Raman, Redmond, WA (US); Paul J. Leach, Seattle, WA (US); Prasanna V. Krishnan, Philadelphia, PA (US)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/302,047

(22) Filed: Dec. 13, 2005

(65) Prior Publication Data

US 2007/0136578 A1    Jun. 14, 2007

(51) Int. Cl.
*G06F 17/30* (2006.01)
*G06F 21/00* (2006.01)

(52) U.S. Cl. .................. 713/182; 726/6; 707/781; 707/783; 707/785

(58) Field of Classification Search ............. 707/9, 707/781, 785; 726/6; 713/182
See application file for complete search history.

(56) References Cited

U.S. PATENT DOCUMENTS

| | | | |
|---|---|---|---|
| 5,483,596 A | | 1/1996 | Rosenow |
| 5,701,458 A | * | 12/1997 | Bsaibes et al. .............. 707/9 |
| 5,778,222 A | * | 7/1998 | Herrick et al. .............. 707/9 |
| 6,308,173 B1 | | 10/2001 | Glasser |
| 6,412,070 B1 | * | 6/2002 | Van Dyke et al. ........... 726/17 |
| 6,438,549 B1 | * | 8/2002 | Aldred et al. ............... 707/9 |
| 6,513,039 B1 | | 1/2003 | Kraenzel et al. |
| 6,757,680 B1 | | 6/2004 | Choy |
| 6,823,338 B1 | | 11/2004 | Byrne et al. |
| 2002/0157016 A1 | | 10/2002 | Russell et al. |
| 2003/0074356 A1 | | 4/2003 | Kaler et al. |
| 2003/0088786 A1 | | 5/2003 | Moran et al. |
| 2005/0015674 A1 | | 1/2005 | Haugh |
| 2005/0049993 A1 | * | 3/2005 | Nori et al. ................... 707/1 |
| 2005/0055354 A1 | * | 3/2005 | Thompson et al. .......... 707/100 |
| 2005/0055380 A1 | * | 3/2005 | Thompson et al. .......... 707/200 |
| 2005/0071641 A1 | | 3/2005 | Basibes et al. |
| 2005/0091518 A1 | * | 4/2005 | Agarwal et al. ............. 713/193 |

(Continued)

OTHER PUBLICATIONS

Iizuka, Lau, and Suda. "A Design of Local Resource Access Control for Mobile Agent in PDA" Conference Records from the Special Section on the APCC Proceedings. (Revised, Jun. 30, 2001), 4 pages.
Hale, Threet, and Shenoi. "Capability-Based Primitives for Access Control in Object-Oriented Systems" (1998) 18 pages.

(Continued)

*Primary Examiner*—Christian LaForgia
(74) *Attorney, Agent, or Firm*—Workman Nydegger

(57) ABSTRACT

An item inheritance system and method are provided. The item inheritance system can be employed to propagate access control information (e.g., an access control list) to one or more item(s), thus facilitating security of item(s). At least one of the item(s) is a compound item.

The item inheritance system includes an input component that receives information associated with one or more items. The items can include container(s), object(s) and/or compound item(s). The system can be triggered by a change in security policy to the item(s), for example, adding and/or deleting a user's access to the item(s). Additionally, moving and/or copying a collection of items can further trigger the system.

The system further includes a propagation component that propagates access control information to the item(s). For example, the propagation component can enforce the ACL propagation policies when a change to the security descriptor takes place at the root of a hierarchy.

18 Claims, 8 Drawing Sheets

U.S. PATENT DOCUMENTS

2005/0262132 A1    11/2005  Morita et al.
2006/0236381 A1*   10/2006  Weeden .......................... 726/6
2006/0294578 A1*   12/2006  Burke et al. .................... 726/2

OTHER PUBLICATIONS

Swift, Burndrett, Van Dyke, Garg, Hopkins, Chan, Goertzel, and Jensworth. "Improving the Granularity of Access Control in Windows NT" (May 2001) pp. 87-96.

Karjoth, Gunter. "Access Control with IBM Tivoli Access Manager" ACM Transactions on Information and System Security, vol. 6, No. 2. (May 2003) pp. 232-257.

Allison, Hawley, Borr, Muhlestein, and Hitz. "File System Security: Secure Network Data Sharing for NT and UNIX" Proceedings of the Large Installation System Administration of Windows NT Conference Seattle, Washington. (Aug. 5-8, 1998) 14 pages.

* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GR | GW | GE | GA | \multicolumn{4}{c}{Reserved} | AS | \multicolumn{7}{c}{Standard Access Rights} | \multicolumn{16}{c}{Object-Specific Access Rights} |

```
GR  --> Generic_Read
GW  --> Generic_Write
GE  --> Generic_Execute
GA  --> Generic_ALL
AS  --> Right to access SACL
```

FIG. 5

ACCESS CONTROL LIST INHERITANCE THRU OBJECT(S)

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable, secure manner that facilitates user friendly and quick data searches and retrieval. With a continuing and increasing creation of data from end-users, the problems and difficulties surrounding finding, relating, manipulating, and storing such data escalate. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. When obtaining such data, the data needs to be securely stored. In other words, the problems and difficulties surrounding finding, relating, manipulating, and storing data affect both the developer and the end user. In particular, the integrity and security of data must be ensured with any manipulation of such data without disrupting and/or invoking any unstable conditions within conventional systems and/or databases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An item inheritance system and method are provided. The item inheritance system can be employed to propagate access control information (e.g., an access control list) to one or more item(s), thus facilitating security of item(s), with at least one of the item(s) being a compound item.

The item inheritance system includes an input component that receives information associated with one or more items. The items can include container(s), object(s) and/or compound item(s). The system can be triggered by a change in security policy to the item(s), for example, adding and/or deleting a user's access to the item(s). Additionally, moving and/or copying a collection of items can further trigger the system.

Each item includes an access control list (ACL) which is comprised of zero, one or more access control entries (ACEs). An ACE can be specified, for example, as: principal (e.g., Joe), access right(s) (e.g., read, write, delete, etc.), and, inheritance flags. The inheritance flags can include, for example, container inherit (CI), object inherit (OI), and, inherit only (IO). When determining access to an item, the security subsystem skips ACEs marked with IO, that is, absence of IO makes an ACE effective for the item.

The system further includes a propagation component that propagates access control information (e.g., ACL) to the item(s). For example, the propagation component can enforce the ACL propagation policies when a change to the security descriptor takes place at the root of a hierarchy.

The system can be employed as a component of a relational file system that bridges the gap between file system(s) and database(s) and provides a unified, rich programming platform for data including structured, semi-structured and unstructured. The relational file system namespace assigns a unique name to each item and orders them within a containment hierarchy. Because security administration often scopes an entire hierarchy rather than a single item, administrators specify various inheritance semantics for propagating ACLs to the children of a given a root. The propagation component can enforce the ACL propagation policies when a change to the security descriptor takes place at the root of a hierarchy.

In one example, ACL propagation is done synchronously as a single transaction and has the following security semantics. ACL propagation can be triggered by a change in security descriptors on an existing item. This change can be the result of explicitly re-ACLing an existing item (e.g., using SetItemSecurity) and/or by moving a tree rooted at a given item.

The relational file system can be hierarchical and thus expose a parent-child relationship. Every item in the system except for the root of the tree has exactly one parent. Security policy on a child item is computed as a result of the security policy on the parent item, a specified (or existing) security policy on the child item and the type of the child item. When the security policy—for example, access control list (ACL)—on a given item changes, every item in the subtree below it must have its Security Policy updated.

Initially, with respect to ACL propagation, a distinction can be drawn between security container(s) and security object(s). Security container(s) can contain other item(s), for example directory(ies), registry key(s) and/or Active Directory object(s). An access control entry (ACE) specifying container inherit (CI) on any ancestor is effective on security container(s) and is maintained. Further, an ACE specifying object inherit (OI) on any ancestor is inherit only (IO) on security container(s), that is, it is not effective on the container itself. Additionally, security container(s) allow propagation of ACLs thru them to their children.

Security object(s) are leaves of the tree structure, for example, file(s) in a file system. An ACE specifying OI on any ancestor is effective on security object(s). Additionally, an ACE specifying CI on any ancestor is not inherited on security object(s) as object(s) do not contain container(s). Security objects do not allow propagation of ACLs thru them as object(s) can not contain other items. Thus, with respect to an OI ACE, an object inherits the ACE and removes the OI flag.

Finally, in one example, the propagation component can employ the following propagation policy. When an item inherits ACEs from more than one ancestor the order of precedence is that ACEs from the immediate parent precede the ones from a distant ancestor. If this initiating action can be performed by a user, no additional permission checks are performed in the underlying tree. If any of the internal nodes is "protected", then the ACL is not propagated to this node or the tree underneath the node, regardless of the permissions the user may hold in the sub tree.

A distinction is drawn between container(s) (e.g., directory(ies)) and non-container(s) (e.g., object(s)). In this example, a generic container item is treated as a container and for security purposes rules related to containers (e.g., folders) apply to generic container items. A file backed item (FBI) is a leaf level item in any hierarchy and it is treated as a non-container when making security decisions. Further, compound items are considered as non-containers when making an access control and/or auditing decision. This maintains symmetry between instances that are file backed and those that are not. Because the relational file system data model permits compound items to contain other items (e.g., an e-mail can contain a document), a compound item acts as a propagator of security descriptors.

Thus, in this example, the propagation component inherits object inherit (OI) ACEs for compound item(s), and allows propagation of ACEs thru them. More particularly, with respect to compound item(s), the propagation component propagates ACEs as follows:

Container Inherit ACE—Inherits as Container Inherit, Inherit Only

Object Inherit Ace—Inherits as Object Inherit

In this manner, for compound item(s), since container inherit ACEs are retained, security container items created below a non file backed item(s) (NFBIs) get a default security policy (e.g., an expected security policy or a security policy exactly the same as the one they would get if the parent was a container). Further, since the object inherit flag is retained, security object item(s) created below NFBIs get a default security policy (e.g., an expected security policy or a security policy exactly the same as the one they would get if the parent was a container). Finally, since object inherit ACEs are inherited as effective (e.g., not Inherit Only) and container inherit ACEs are marked as Inherit Only, NFBIs have the same access control policy as FBI.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

BRIEF DESCRIPTION OF THE DRAWINGS

FIG. 5 is a diagram of a mask of a discretionary access control list.

DETAILED DESCRIPTION

Figure 1:
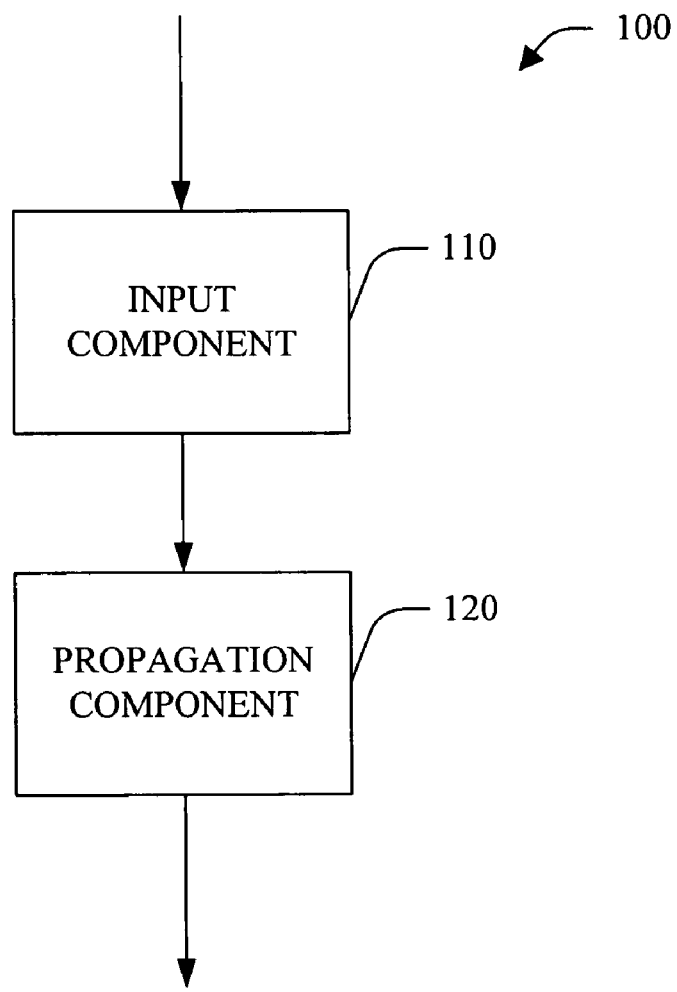
FIG. 1 is a block diagram of an item inheritance system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, an item inheritance system 100 is illustrated. The system 100 can be employed to propagate access control information (e.g., an access control list) to one or more item(s), thus facilitating security of item(s).

The item inheritance system 100 includes an input component 110 that receives information associated with one or more items. The items can include container(s), object(s) and/or compound item(s), as discussed in greater detail below. The system 100 can be triggered by a change in security policy to the item(s), for example, adding and/or deleting a user's access to the item(s). Additionally, moving and/or copying a collection of items can further trigger the system 100.

Each item includes an access control list (ACL) which is comprised of zero, one or more access control entries (ACEs). An ACE can be specified as: principal (e.g., security identifier), access right(s) (e.g., read, write, delete, etc.), and, inheritance flags. The inheritance flags can include, for example, container inherit (CI), object inherit (OI), and, inherit only (IO). When determining access to an item, the security subsystem skips ACEs marked with IO, that is, absence of IO makes an ACE effective for the item.

The system 100 further includes a propagation component 120 that propagates access control information (e.g., ACL) to the item(s). For example, the propagation component 120 can enforce the ACL propagation policies when a change to the security descriptor takes place at the root of a hierarchy.

The system 100 can be employed, for example, as a component of a relational file system (not shown) that bridges the gap between file system(s) and database(s) and provides a unified, rich programming platform for data including structured, semi-structured and unstructured. In order to more fully discuss the system 100, the relation file system is described below.

Relational File System

The relational file system can be based on a data model that is highly structured and item-centric. In the relational file system, an "item" is the smallest unit of consistency. An item can be independently handled in the store. For example, an item can be secured, serialized, synchronized, copied, and backed-up and/or restored. Item(s) can be stored in a single global extent of items and each item has an identifier that is guaranteed to be unique in a given relational file system store.

Continuing with this example, the relational file system can include two types of containers: a generic container and a compound item. A generic container behaves like a folder in a traditional file system. Each item in the generic container is a separate unit of consistency. For example, when a container is copied the default behavior is that each item in the container is serialized and copied separately. This operation can be long-running and if there is an interruption during the copy process, the destination container may not have an exact copy of the items in the source.

A compound item forms a single unit of consistency by including a container and the item(s) in the container. In this example, a compound item is treated as a unit. For example, a copy operation copies either the whole compound item or nothing (e.g., item(s) within the compound item are not copied separately). Compound items can be instantiated as items, which are manifested as a schematized set of data, or file-backed items (FBIs). FBIs have a backing stream stored in a traditional file system.

Additionally, items can contain other items with the exception of FBIs that act as the leaf nodes in the hierarchy. An item only exists in the container that is specified when the item is created. A container can be deleted after all item(s) in that container have been deleted.

Figure 2:
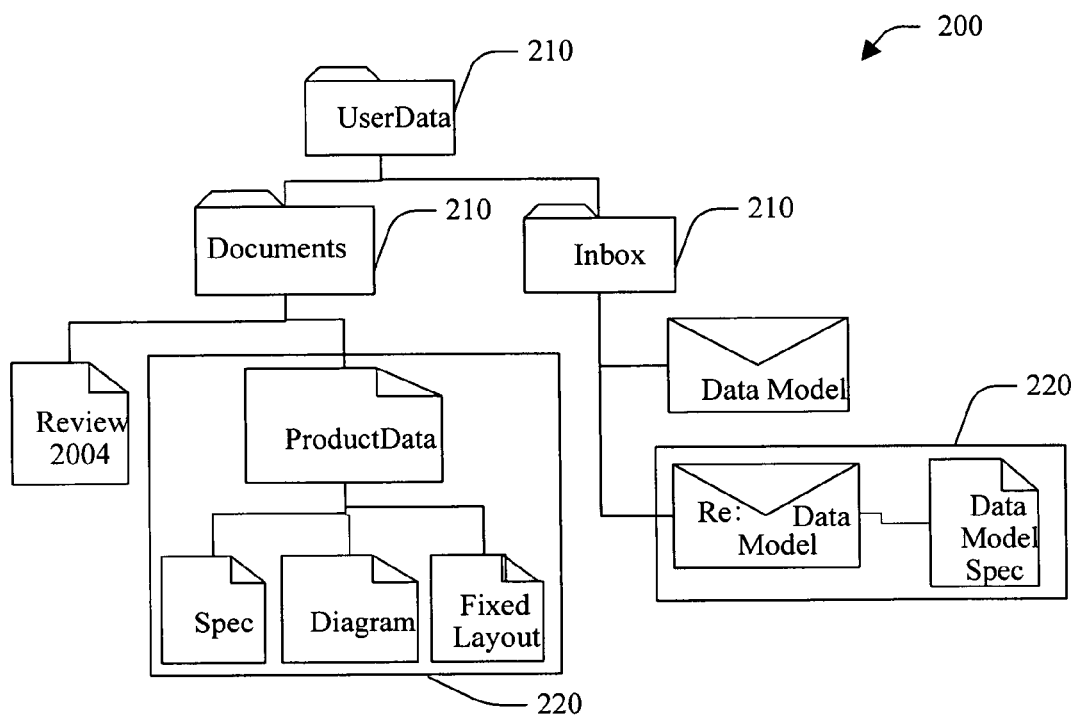
FIG. 2 is a block diagram of a relational file system containment hierarchy.

Referring to FIG. 2, a relational file system containment hierarchy 200 is illustrated. Containers 210 in the relational file system form the hierarchy 200 and a container 210 only exists in one parent container 210. Any item type can act as a container 210. Every item has a parent item and the parent item acts as a container for the child item.

Security Model

Figure 3:
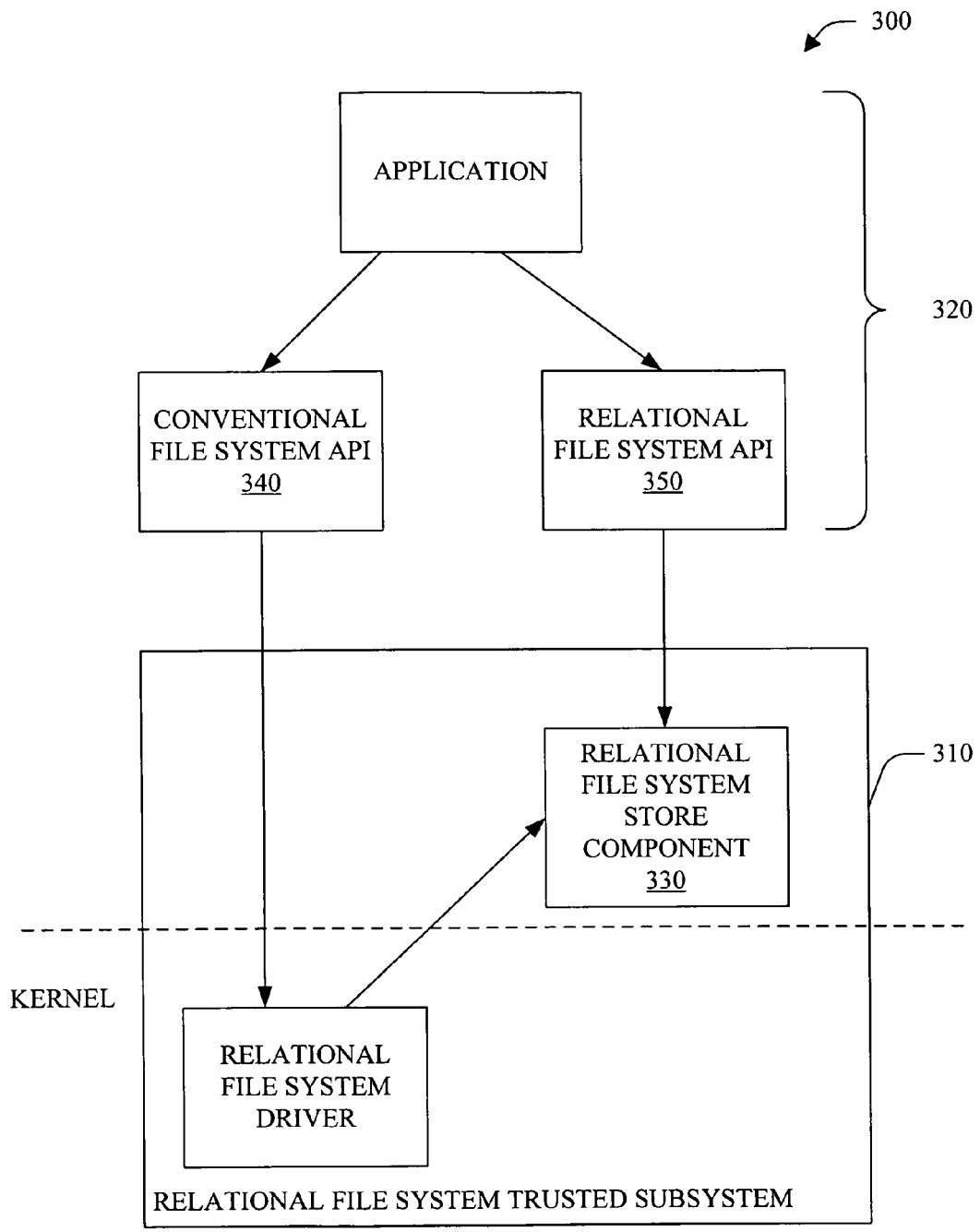
FIG. 3 is a block diagram of a relational file system trust boundary.

Referring to FIG. 3, a relational file system trust boundary 300 is illustrated. The relational file system 300 is composed of a trusted component 310 and an un-trusted component 320. A relational file system store component 330 deals with object storage and retrieval.

A conventional file system API 340 and relational file system API 350 provide programming semantics to the platform and runs in the user processes. User(s) are authenticated at connection time, and retrieved objects are materialized in the client space. In this example, no security checks or access constraints are enforced by the client on these objects. The store component 330 enforces access control when the client interacts with the store component 330 while accessing or updating the objects.

Next, authentication is the process by which the relational file system establishes the identity of the principal who is requesting storage services. For both the relational file system API 350 and the conventional file system API 340 access points, the requesting principal is authenticated at the boundary of the trusted subsystem 310. The result of the authentication process is a security token that represents the principal accessing the relational file system. This token is subsequently used for impersonation and/or making authorization and auditing decisions on behalf of the user. Only authenticated users (AU) are allowed to connect to the relational file system.

Authorization

Authorization is built on share level security and item level security. When enforcing security, permission is only granted if it is granted by both share level and item level security. Items and shares can have associated security descriptors.

In one example, a security descriptor includes the Owner, Group, Discretionary Access Control List (DACL) and System Access Control List (SACL). The Owner is the security identifier of the principal who owns the object. The primary Group is maintained for compatibility and does not generally apply to the relational file system. DACL dictates the access rules and SACL dictates the auditing rules.

Figure 4:
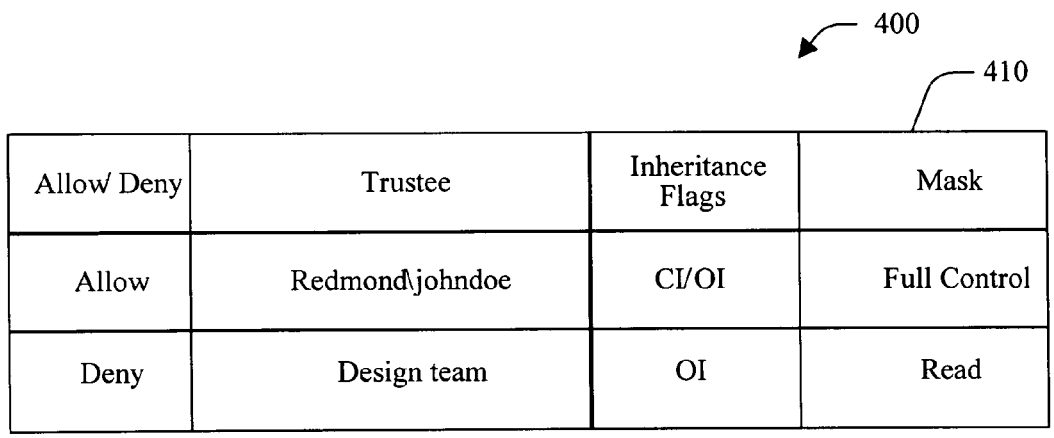
FIG. 4 is a diagram of a discretionary access control list.

FIG. 4 illustrates a simplified view of a DACL 400 as it is applied to the user "johndoe". The DACL 400 includes a mask 410 which is illustrated further in FIG. 5. Table 1 below illustrates the bit definitions that can be employed:

TABLE 1

| Bit Value | File | Folder |
| --- | --- | --- |
| 0x1 | FILE_READ_DATA | FILE_LIST_DIRECTORY |
| 0x2 | FILE_WRITE_DATA | FILE_ADD_FILE |
| 0x4 | FILE_APPEND_DATA | FILE_ADD_SUBDIRECTORY |
| 0x8 | FILE_READ_EA | FILE_READ_EA |
| 0x10 | FILE_WRITE_EA | FILE_WRITE_EA |
| 0x20 | FILE_EXECUTE | FILE_TRAVERSE |
| 0x40 | N/A | FILE_DELETE_CHILD |
| 0x80 | FILE_READ_ATTRIBUTES | FILE_READ_ATTRIBUTES |
| 0x100 | FILE_WRITE_ATTRIBUTES | FILE_WRITE_ATTRIBUTES |
| 0x00010000 | DELETE | DELETE |
| 0x00020000 | READ_CONTROL | READ_CONTROL |
| 0x00040000 | WRITE_DAC | WRITE_DAC |
| 0x00080000 | WRITE_OWNER | WRITE_OWNER |

An item is the base unit of policy administration in the relational file system—each item can be independently secured. For each item, the relational file system associates and stores a security descriptor that describes the access and audit rules for the particular item. By default, the root item of the store is granted full access to built-in Administrators and Local System. Other security principals do not have any default access on the root item.

When new items are created under the root, they inherit the default security descriptor from the root (if the security descriptor on the new item is not already protected). If an explicit security descriptor is specified as part of a create action, a logical composition of the explicit security descriptor and the security descriptor on the parent is applied to the new item, as discussed below.

When making access control decisions based on access control entries (ACEs) in the DACL, access is denied when a deny ACE is encountered. Conversely, access is granted when an allow ACE is in place. As a result, different ordering can happen when different access control decisions are made. A canonical DACL orders the explicit deny access control entries (ACEs) before the explicit allow ACEs. A non-canonical DACL does not guarantee this ordering.

ACL Propagation by the Propagation Component 120

The relational file system namespace assigns a unique name to each item and orders them within a containment hierarchy, as discussed above. Because security administration often scopes an entire hierarchy rather than a single item, administrators specify various inheritance semantics for propagating ACLs to the children of a given root. The propagation component 120 can enforce the ACL propagation policies when a change to the security descriptor takes place at the root of a hierarchy.

In one example, ACL propagation is done synchronously as a single transaction and has the following security semantics. ACL propagation can be triggered by a change in security descriptors on an existing item. This change can be the result of explicitly re-ACLing an existing item (e.g., using SetItemSecurity) and/or by moving a tree rooted at a given item.

As discussed previously, the relational file system can be hierarchical and thus expose a parent-child relationship. Every item in the system except for the root of the tree has exactly one parent. Security policy on a child item is computed as a result of the security policy on the parent item, a specified (or existing) security policy on the child item and the type of the child item. When the security policy—for example, access control list (ACL)—on a given item changes, every item in the subtree below it must have its security policy updated (e.g., ACL propagation).

Initially, with respect to ACL propagation, a distinction can be drawn between security container(s) and security object(s). Security container(s) can contain other item(s), for example directory(ies), registry key(s) and/or Active Directory object(s). An access control entry (ACE) specifying container inherit (CI) on any ancestor is effective on security container(s) and is maintained. Further, an ACE specifying object inherit (OI) on any ancestor is inherit only (IO) on security container(s), that is, it is not effective on the container itself. Additionally, security container(s) allow propagation of ACLs thru them to their children.

Security object(s) are leaves of the tree structure, for example, file(s) in a file system. An ACE specifying OI on any ancestor is effective on security object(s). Additionally, an ACE specifying CI on any ancestor is not inherited on security object(s) as object(s) do not contain container(s). Security objects do not allow propagation of ACLs thru them as object(s) can not contain other items. Thus, with respect to an OI ACE, an object inherits the ACE and removes the OI flag.

Finally, in one example, the propagation component 120 employs the following propagation policy. When an item inherits ACEs from more than one ancestor the order of precedence is that ACEs from the immediate parent precede the ones from a distant ancestor. If this initiating action can be performed by a user, no additional permission checks are performed in the underlying tree. If any of the internal nodes is "protected", then the ACL is not propagated to this node or the tree underneath the node, regardless of the permissions the user may hold in the sub tree.

As noted previously, a distinction is drawn between container(s) (e.g., directory(ies)) and non-container(s) (e.g., object(s)). In this example, a generic container item is treated as a container and for security purposes rules related to containers (e.g., folders) apply to generic container items. A file backed item (FBI) is a leaf level item in any hierarchy and it is treated as a non-container when making security decisions. Further, compound items are considered as non-containers when making an access control and/or auditing decision. This maintains symmetry between instances that are file backed and those that are not. Because the relational file system data model permits compound items to contain other items (e.g., an e-mail can contain a document), a compound item acts as a propagator of security descriptors.

For example, the following semantics can be employed when propagating template ACEs (with CO/CG/GR/GW/GX/GA). Generic read (GR), generic write (GW), generic execute (GX) and generic all (GA) represent permissions and creator owner (CO) and creator group (CG) represent identities. "ID" refers to an inherited flag.

---

If the ACE is applicable to objects (for example, ACE, CO, OI)
{
    Copy the ACE, IO, ID (for example, ACE, CO, OI, IO, ID)
    Instantiate the template, ID (for example, Redmond\johndoe, ID)
} else if the ACE is applicable to containers (for example, ACE, CO, CI)
{
    Copy the ACE, IO, ID (for example, ACE, CO, CI, IO, ID)
}

---

Similar semantics are used when propagating template ACEs with generic permissions.

---

If the ACE is applicable to objects (for example, Redmond\johndoe GR, OI)
{
    Copy the ACE, IO, ID (for example, Redmond\johndoe GR, IO, OI, ID)
    Instantiate the template (for example, Redmond\johndoe FILE_GENERIC_READ, OI, ID)
} else if the ACE is applicable to containers (for example, Redmond\johndoe GR, CI)
{
    Copy the ACE, IO, ID (for example, Redmond\Johndoe GR, CI, IO, ID)
}

---

A template ACE can be applied against both the fields (for example, GW, or CO) and both the fields would be instantiated whenever applicable during propagation (for example, FILE_GENERIC_WRITE, Redmond\johndoe, ID). In cases where IO and/or ID are on the parent, the semantics remain the same as previously described.

Figure 6:
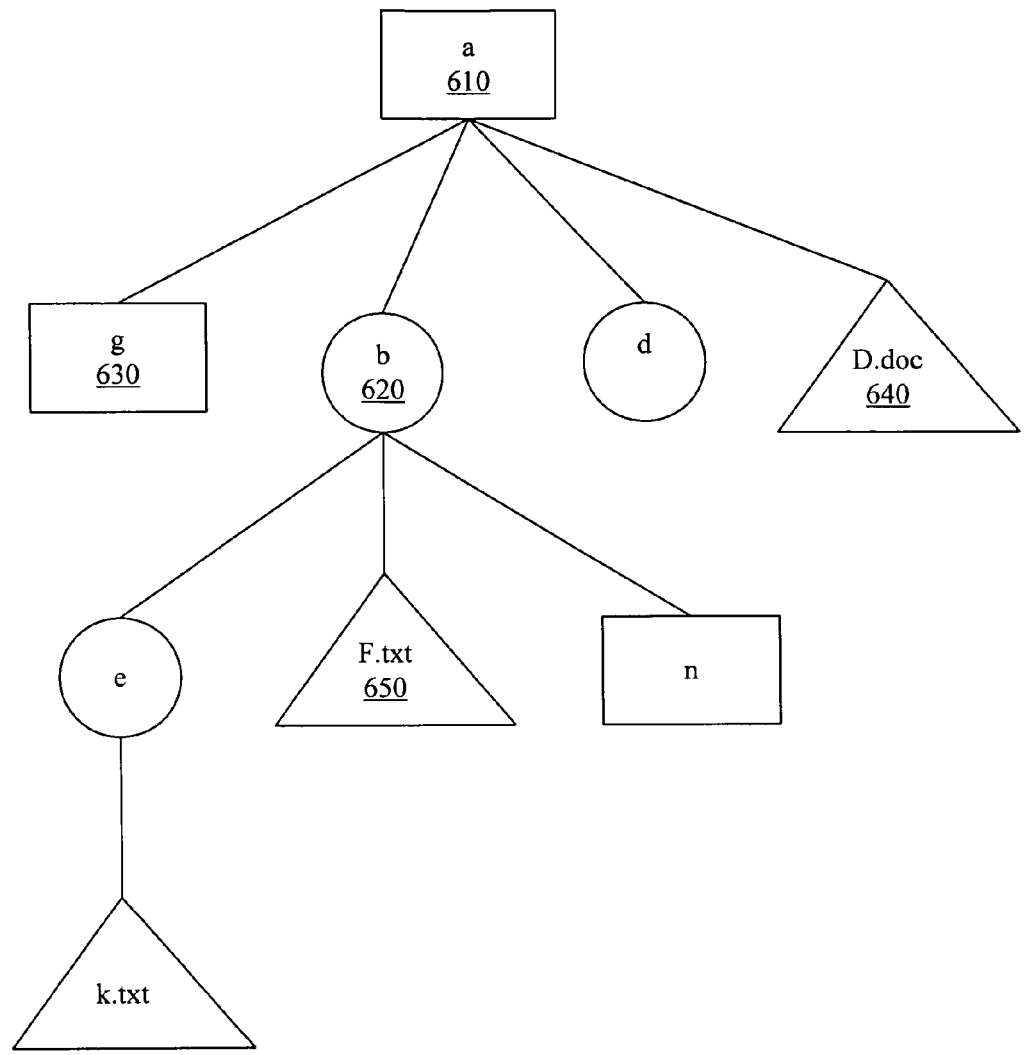
FIG. 6 is a diagram of a relational file system hierarchy

Referring to FIG. 6, an example relational file system hierarchy 600 is illustrated. In this example, containers are rectangles, object(s) are triangles and compound item(s) are circles. In this example, an ACL for item a 610 includes the following ACEs with "NP" representing propagate to immediate children only and no further and "ID" representing "inherited":

ACE1 CI OI
ACE2 CI OI NP
ACE3 CI
ACE4 OI

ACE5 CI NP
ACE6 OI NP

Based on these ACEs for item a 610, the propagation component 120 propagates the following ACLs to the other items:

Item b 620:
　ACE1 CI OI ID
　ACE2 ID
　ACE3 CI IO ID
　ACE4 OI ID
　ACE5 is skipped
　ACE6 ID Item g 630:
　ACE1 CI OI ID
　ACE2 ID
　ACE3 CI ID
　ACE4 OI IO ID
　ACE5 ID
　ACE6 is skipped Item "d.doc" 640:
　ACE1 ID
　ACE2 ID
　ACE3 is skipped
　ACE4 ID
　ACE5 is skipped
　ACE6 ID Item "f.txt" 650:
　ACE1 ID
　ACE4 ID Thus, in this example, the propagation component 120 inherits object inherit (OI) ACEs for compound item(s), and allows propagation of ACEs thru them. More particularly, with respect to compound item(s), the propagation component 120 propagates ACEs as follows:

Container Inherit ACE—Inherits as Container Inherit, Inherit Only
　Object Inherit Ace—Inherits as Object Inherit In this manner, for compound item(s), since container inherit ACEs are retained, security container items created below a non file backed item(s) (NFBIs) get a default security policy (e.g., an expected security policy or a security policy exactly the same as the one they would get if the parent was a container). Further, since the object inherit flag is retained, security object item(s) created below NFBIs get a default security policy (e.g., an expected security policy or a security policy exactly the same as the one they would get if the parent was a container). Finally, since object inherit ACEs are inherited as effective (e.g., not Inherit Only) and container inherit ACEs are marked as Inherit Only, NFBIs have the same access control policy as FBI.

It is to be appreciated that the system 100, the input component 110 and the propagation component 120 can be computer components as that term is defined herein.

Figure 7:
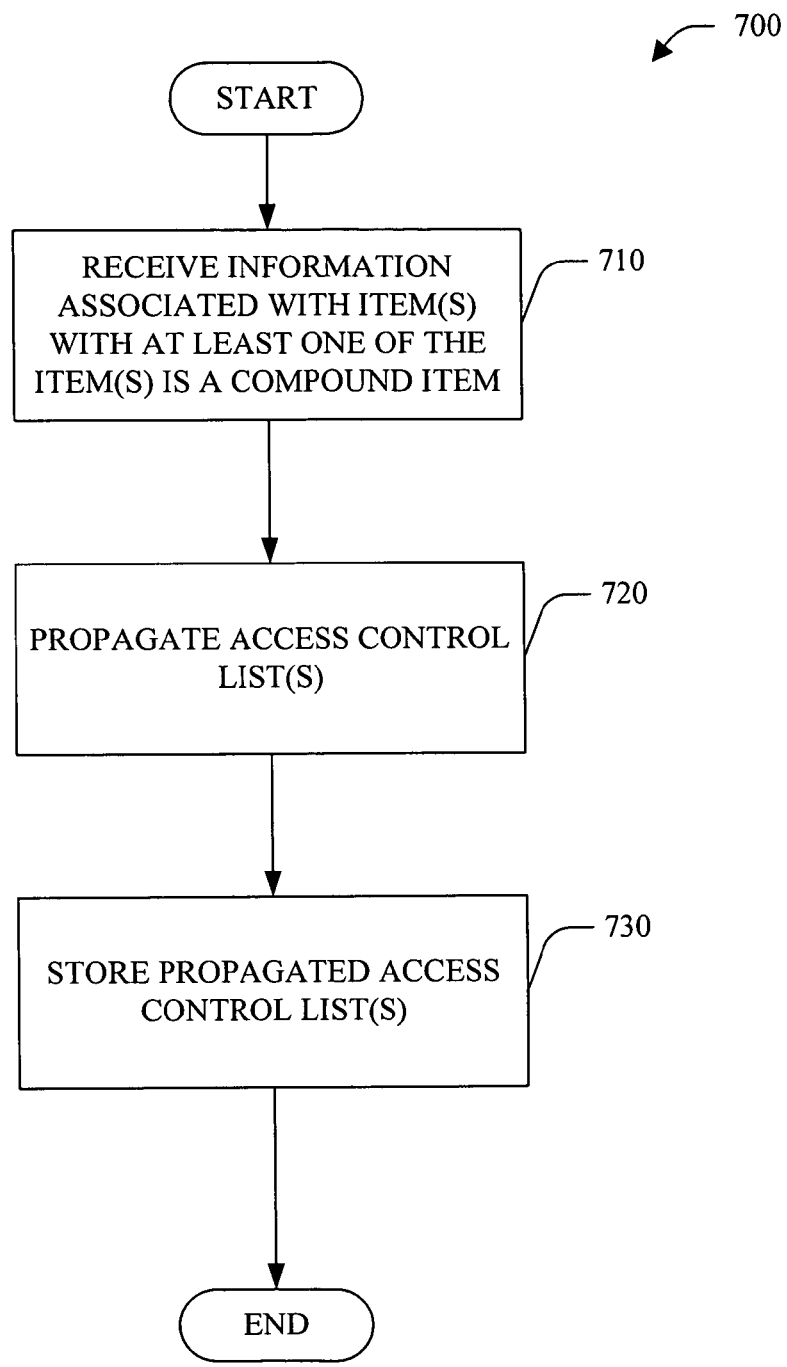
FIG. 7 is a flow chart of a method for propagating access control information.

Turning briefly to FIG. 7, a methodology that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method for propagating access control information 700 is illustrated. At 710, information associated with item(s) is received, with at least one of the item(s) being a compound item. At 720, access control list(s) are propagated. At 730, the propagated access control list(s) are stored.

Figure 8:
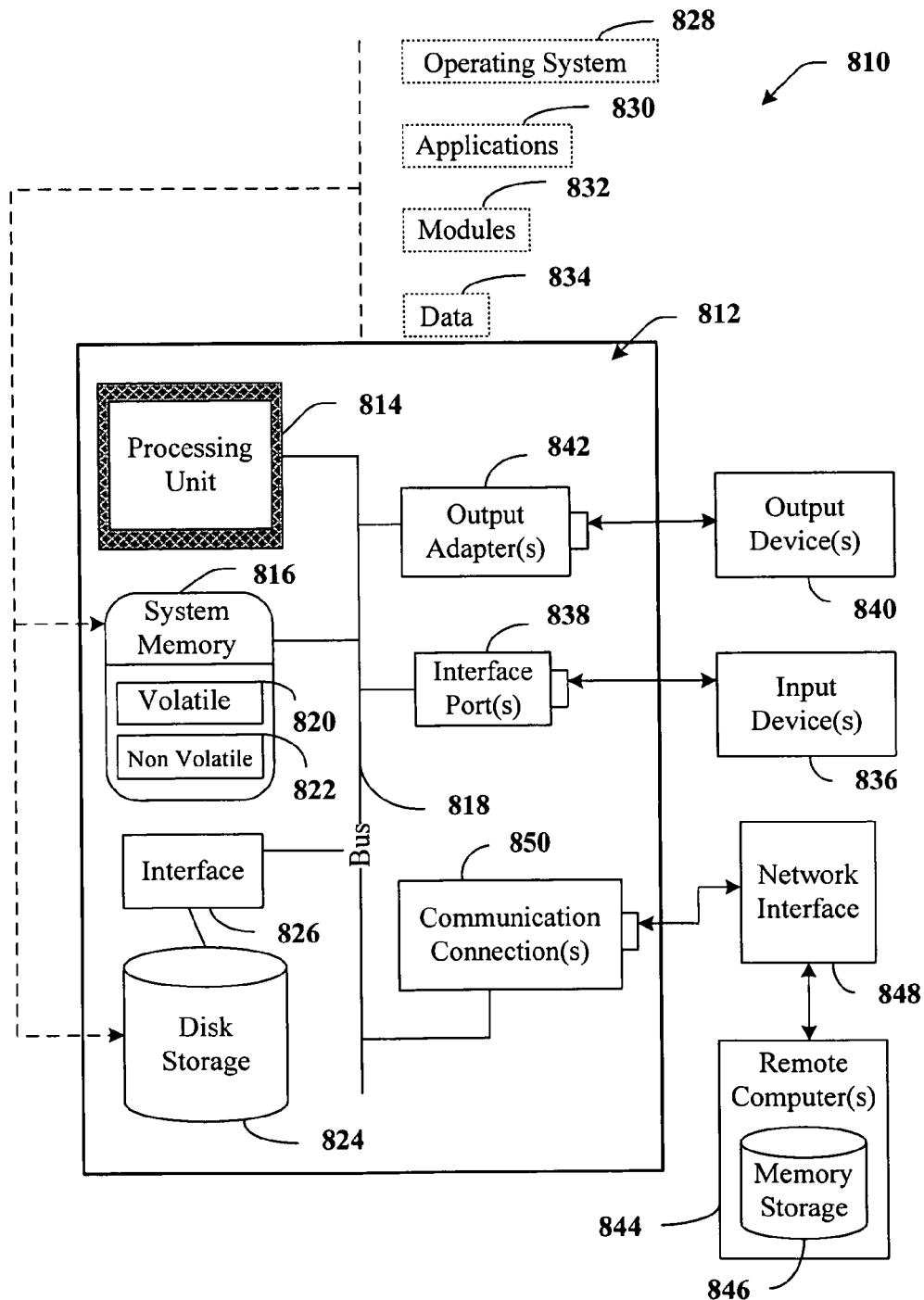
FIG. 8 illustrates an example operating environment.

In order to provide additional context for various aspects of the claimed subject matter, FIG. 8 and the following discussion are intended to provide a brief, general description of a suitable operating environment 810. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a computing environment comprising a processing unit and memory, a computer-implemented method for propagating access control information in a relational file system, the method comprising:

triggering propagation of access control information when at least one security descriptor of a first item of a plurality of items in an item hierarchy is changed, wherein each of the plurality of items is one of a generic container item that contains zero or more items, a file backed item that is a leaf node in the item hierarchy, or a compound item that stores at least one container and at least one item in the container as a single unit of consistency, wherein each of the plurality of items that is not a root item of the item hierarchy has exactly one parent item, and wherein at least one of the plurality of items is a compound item;

propagating, synchronously and as a single transaction, an access control list (ACL) corresponding to the first item to a second item that is a child of the first item in a sub tree of items below the first item in the item hierarchy, the ACL comprising one or more access control entry (ACE), each ACE comprising an access right and at least one inheritance flag that is one of "container inherit," "object inherit" or "inherit only," wherein there is at least one ACE with a "container inherit" inheritance flag and at least one ACE with an "object inherit" inheritance flag, and wherein propagating the ACL to the second item based, at least in part, upon the ACL of the first item, an ACL of the second item and an item type of the second item, the propagation comprising:

identifying the item type the second item as one of a generic container, a file backed item, or a compound item, as well as identifying whether or not the second item is protected, and when the second item is not protected and is a generic container, propagating to the second item each "container inherit" flagged ACE as "container inherit," and propagating to the second item each "object inherit" flagged ACE as "object inherit" and "inherit only";

when the second item is not protected and is a file backed item and therefore a leaf node, propagating to the second item, with the "object inherit" flag removed, each "object inherit" flagged ACE, and not propagating to the second item any "container inherit" flagged ACE;

when the second item is not protected and is a compound item, treating the second item as a non-container item by propagating to the second item each "object inherit" flagged ACE as "object inherent," thus allowing propagation of the "object inherit" flagged ACE through the compound item, and propagating to the second item each "container inherit" flagged ACE as "container inherit" and "inherit only"; and when the second item is protected, not propagating to the second item an ACE, thereby preventing propagation of access control information to the second item and any item in a sub tree of items below the second item, regardless of permissions a user may hold in the sub tree of items below the second item; and storing the propagated access control list for the second item.

2. The method of claim 1, wherein the access control information comprises at least one access control list comprising at least one ACE.

3. The method of claim 1, wherein when an item inherits an ACE from more than one ancestor, the order of precedence is that ACE's from the immediate parent precede the ones from a distant ancestor.

4. The method of claim 1, wherein the one or more ACE's each comprise a principal, an access right and at least one inheritance flag.

5. The method of claim 1, wherein the one or more ACE's of the access control list have, collectively, at least one of each of the following inheritance flags: "container inherit," "object inherit," "do not propagate," "inherit only" or "inherited."

6. The method of claim 1, wherein propagation is triggered by one of copying or moving the first item.

7. The method of claim 1, wherein access control list propagation policy is enforced based, at least in part, upon a change to a security descriptor at the root of a hierarchy.

8. The method of claim 1, wherein propagation is triggered by a change in security policy to an item.

9. The method of claim 1, wherein propagation is triggered by adding and/or deleting a particular user's access to the item(s).

10. The method of claim 1, wherein the compound item is instantiated as a schematized set of data.

11. The method of claim 1, wherein the compound item is instantiated as a file backed item.

12. The method of claim 1, wherein following triggering propagation, access control information is propagated to every item of a plurality of items in the sub tree of items below the first item, including and in addition to the second item, deploying for each item of the plurality of items, the same methodology for propagation that the access control list is propagated to the second item.

13. The method of claim 1, wherein the file backed items of the plurality of items are treated as objects.

14. The method of claim 1, wherein the compound item is a non file backed item, and wherein both generic container items and file backed items created below the non file backed item get a default security policy, and further wherein the non file backed item has the same access control policy as a file backed item because object inherit flagged ACE's for compound items are inherited as effective and not as inherit only.

15. The method of claim 1, wherein the access control list comprises a plurality of ACE's and is ordered canonically such that explicit deny ACE's are ordered before explicit allow ACE's.

16. One or more computer-readable storage media storing computer-executable instructions that, when executed by a processor, perform the method of claim 1.

17. A computer-implemented system comprising a processor operatively coupled to a memory and one or more computer-readable storage media, the storage media having computer-executable instructions that, when executed by the processor, implement the method of claim 1.

18. The system of claim 17 employed as a component of a hierarchical system.

\* \* \* \* \*